E. FULDA.
METHOD OF MANUFACTURING METAL SPOKE WHEELS.
APPLICATION FILED JUNE 3, 1919.
1,340,945.
Patented May 25, 1920.
2 SHEETS—SHEET 1.
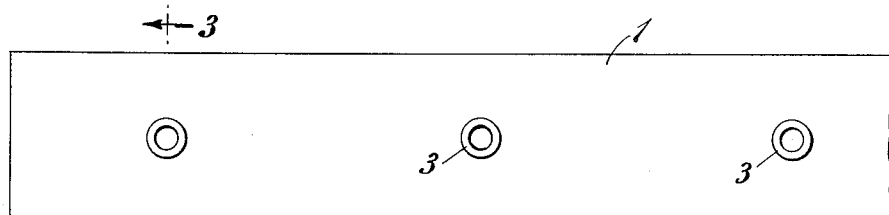
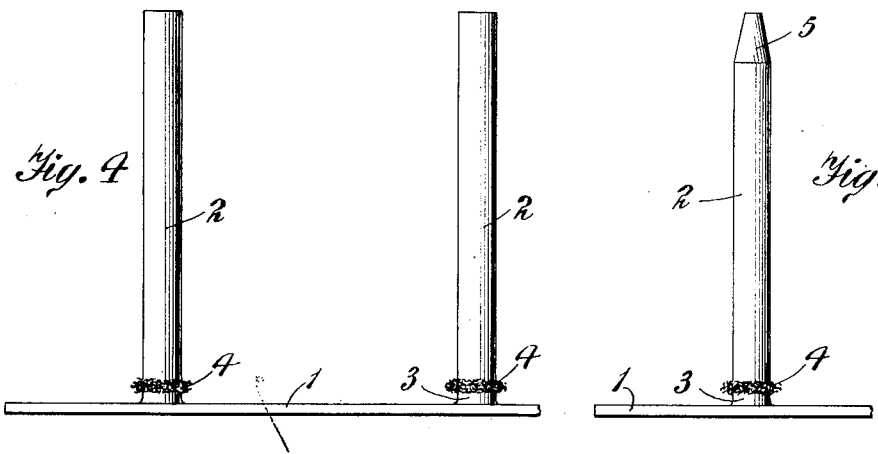
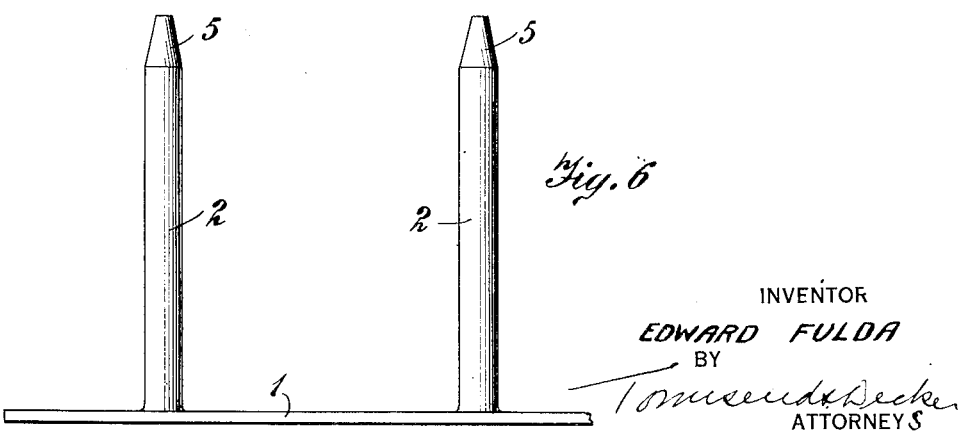
INVENTOR
EDWARD FULDA
BY
Townsend & Decker
ATTORNEYS

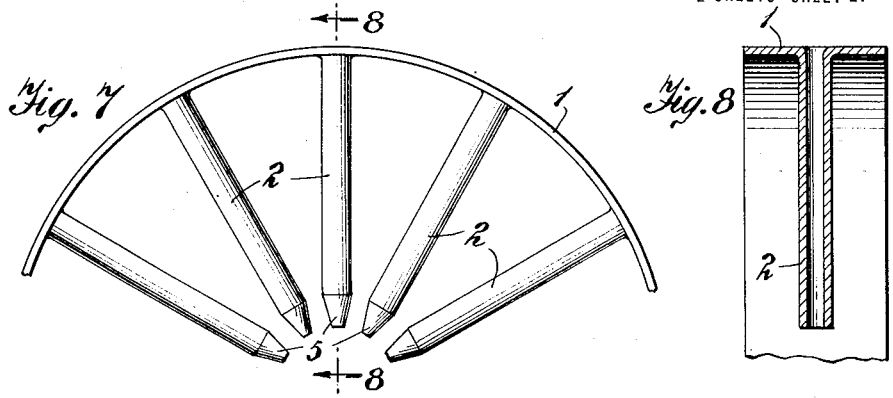
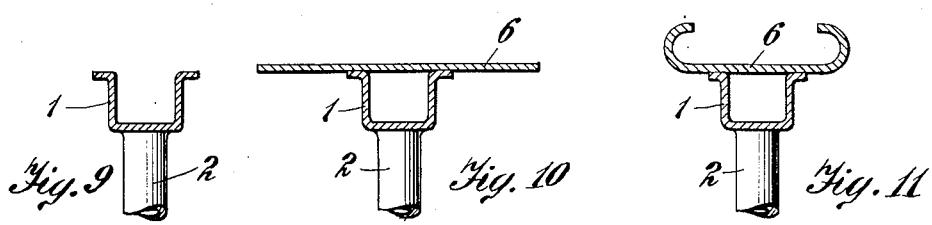
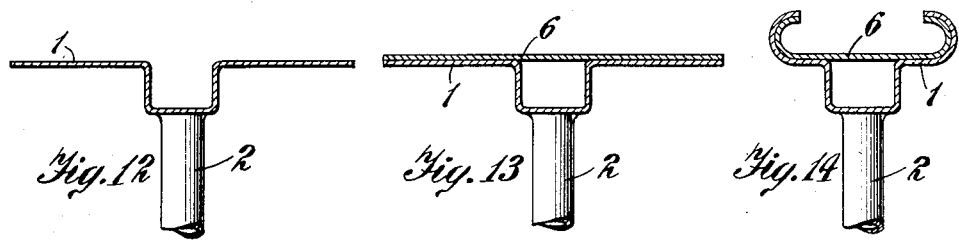
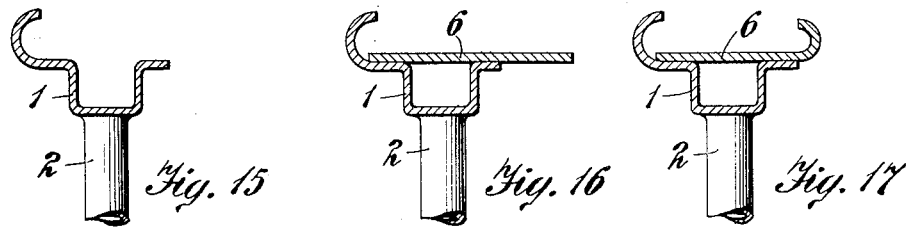
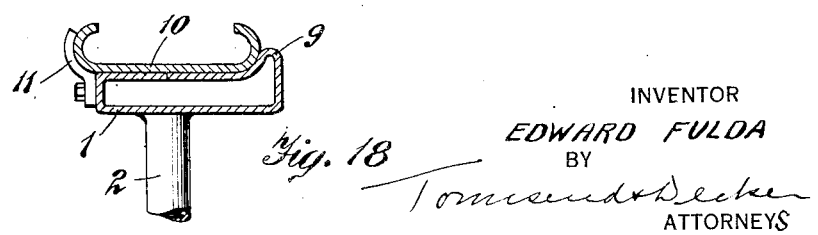

UNITED STATES PATENT OFFICE.

EDWARD FULDA, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

METHOD OF MANUFACTURING METAL-SPOKE WHEELS.

1,340,945.   Specification of Letters Patent.   Patented May 25, 1920.

Application filed June 3, 1919. Serial No. 301,447.

*To all whom it may concern:*

Be it known that I, EDWARD FULDA, a citizen of the United States, and a resident of New York, in the county of New York and State of New York, have invented certain new and useful Improvements in Methods of Manufacturing Metal - Spoke Wheels, of which the following is a specification.

My invention relates to that class of metal wheels in which the rim and spokes are made of separate pieces of metal properly secured together.

The invention relates more particularly to wheels of this general class wherein the union between the spoke ends and rim is a welded union made by the electric welding process. Heretofore in the art it has been proposed in constructing wheels of this character to first form the rim or felly of the wheel and then weld the spokes to the inside of said rim or felly usually by the electric butt welding operation. In this method or process of manufacture difficulty is necessarily experienced in providing a proper machine for holding the rim and arranging the spokes in the desired relation thereto for the welding operation, while moreover it is difficult to remove the bur or enlargement at the welded joint excepting by an operation conducted upon each spoke separately.

The object of my present invention is to facilitate and cheapen the construction of wheels in which the rim and spokes are secured together by a butt welded joint, to which end the invention consists essentially in welding the spokes to a metal strip of proper length, when bent to circular form, to constitute the rim of the wheel, removing the bur formed at the point of union of each spoke, and subsequently bending the strip to the circumference of the rim and welding the ends of the strip together, the ends of the spokes being thereby caused to converge in the hub portion of the wheel and thereafter, if desired, pressing or rolling the edge of the strip to the desired shape in cross-section.

By this process of manufacture all of the spokes of the wheel may be secured to the rim portion practically by one operation in a machine provided with a gang of welding clamps or holders and the bur formed at the weld may likewise be removed by practically one operation through the employment of a suitable gang of reamers or other tools.

The invention further relates to the process of manufacturing a wheel with a hollow metal felly and overturned metal edge suitable, among other things, for holding an automobile tire or demountable rim. This part of my invention consists essentially in first attaching the spokes to a metal strip, bending said strip into the form of the circumference of the wheel, bending up the edges of the strip to form side walls of the hollow felly and applying and securing thereto a sheet metal ring and then bending the edge of said ring into the desired form.

The invention further consists in details of the process as hereinafter more particularly set forth and claimed.

In the accompanying drawings:

Figure 1 is a plan of a metal strip suitable for use, according to my invention, in constructing the rim or felly of the wheel.

Fig. 2 is a side elevation of the same.

Fig. 3 is a cross-section on the line 3—3 Fig. 1.

Fig. 4 shows a portion of a strip with the spokes welded thereto and prior to the finishing of the weld by removing the burs.

Fig. 5 is an end view of Fig. 4 and also shows the hub end of the spoke as having been tapered either before or after the stage of the operation indicated in Fig. 4.

Fig. 6 shows in side elevation a portion of the same strip after the finishing operation upon the weld or bur thereof.

Fig. 7 shows a portion of the strip with attached spokes bent to the circumference of the rim.

Fig. 8 is a cross-section on the line 8—8 Fig. 7.

Fig. 9 shows the edges of the rim bent up for constituting the walls of a tubular or hollow felly.

Fig. 10 shows the same with a metal ring in cross-section applied thereto.

Fig. 11 shows the next stage of the operation consisting in bending the edges of the ring to form an upturned edge or flange suitable for use in holding an automobile tire.

Fig. 12 illustrates a modification wherein the spokes are secured to a strip of sufficient width to be used as a part of the upturned edge of the finished rim.

Fig. 13 shows the same with a metal ring applied thereto to complete the hollow felly and to serve as a reinforcement for the upturned edges.

Fig. 14 shows the next stage of the process consisting in upturning the edges after the application of the ring.

Figs. 15, 16 and 17 illustrate further modifications in the manner of constructing the hollow metal rim with overturned edges adapted to act as edges for a clencher tire.

Fig. 18 illustrates the way in which my invention may be used to construct a hollow metal felly suitable for holding a demountable tire carrying rim.

Referring to Figs. 1 to 8:

1 indicates a portion of a flat metal strip of suitable length to form the rim or circumference of the wheel and of suitable width to permit its edges to be overturned or bent up in the manner hereinafter more particularly described and by a suitable pressing or rolling operation. 2 indicates the spokes shown in this instance as hollow metal spokes. To facilitate the welding operation the strip 1 is first pierced at the point of attachment of the spokes to form the nipples or thimbles 3 against the edges of which the edges of the hollow tubes constituting the spokes may be abutted for an electric butt welding operation. This having been done the spokes are applied in position for welding to the thimbles in a suitable machine which is preferably constructed with a gang of holders, to permit attachment of all or a number of the tubes by practically one welding operation. The result of this operation is the welding of the spokes and the formation, as indicated in Figs. 4 and 5, of burs 4 which, to produce the finished wheel, must be removed. For best effect the joint is further finished by grinding or polishing.

The operation of removing the burs is done while the strip is retained in substantially a flat condition and preferably in a machine having a gang of hollow mills or finishing tools which may be readily applied at this stage of the operation of manufacturing the wheel.

As will be obvious also, the punching of the strip to form thimbles or nipples 3 may also be done immediately by a gang of punchers.

At the stage of the operation so far described the spokes are, if required, tapered or compressed at their ends 5, as indicated, to fit them for use in the assembly of them in the hub. Fig. 6 shows the state of the work thus far produced by illustrating a portion of the strip with the finished spokes attached. The strip with the finished welded spokes attached is next bent to the circumference of the rim or wheel as indicated in Fig. 7, this bending operation being accompanied by a converging of the spokes at the hub part of the wheel. The hub structure is not herein particularly described and claimed as it forms no part of my present invention.

The operation of constructing the finished wheel may be carried along further to the production of a hollow felly or a rim with upturned edge for holding a tire or demountable rim as follows:

The edges of the strip 1 are first pressed or rolled to the shape indicated in Fig. 9 so that they will serve as the two side walls of the hollow rim or felly. The metal ring 6 is then applied and is welded or otherwise secured to the bearing face of the edge of the strip 1, Fig. 9, thereby completing practically the tubular structure of the hollow rim or felly. Thereafter the edges of the ring 6 may be overturned or bent into the form shown in Fig. 11 to form a clencher rim for an automobile tire. Practically the same results may be secured as indicated in Figs. 12, 13 and 14, by utilizing the strip 1 and the ring 6 as reinforcements for one another. In this case the strip 1, as indicated, is made somewhat wider and of substantially the width of the ring 6 so that, after applying the ring as indicated in Fig. 13, the upturning or bending up of the edges of both the strip and the ring will produce the clencher edge desired.

As will be understood and as above indicated, these operations follow the operations of producing the structure indicated in Figs. 7 and 8 in the manner already described.

In the modification indicated in Fig. 15 the spokes 2 are welded to a strip 1 to one side of a medial horizontal line, so that one edge will project more than the other after the production of the structure indicated in Figs. 7 and 8 and the edges are pressed or rolled to the form indicated in Fig. 15. The metal ring 6 is then applied and secured in position as shown in Fig. 16, after which the free edge of the strip itself is bent up to form the other overturned edge of a clencher rim. The result, as will be seen and as before described, is also the production of a hollow felly. Instead of making the hollow rim or felly by utilizing a superposed ring 6, it may be made as indicated in Fig. 18 by using a strip of sufficient width which, after the welding of the spokes thereto and the bending of the strip to the circumference of the rim, may have its edges overturned and bent up so as to form by themselves a hollow tubular felly, the edges of the strip being brought together and suitably fastened by welding or other metal working operation, as indicated at 8. In this forming or bending of the edges of the strip a shoulder 9 may be formed to constitute a ledge or seat at one edge of the finished wheel against which demountable tire carrying rim 10 may abut and be held in place by the usual or any suitable rim-holding clamps, one of which is indicated at 11.

What I claim as my invention is:—

1. The herein described method of constructing metal wheels having metal rims and spokes, consisting in welding the spokes to a substantially flat strip of metal adapted to form the rim of the wheel, cleaning or finishing the weld and then bending the strip to the form of the circumference of the rim in the completed wheel and causing the ends of said spokes to converge in the hub part.

2. The herein described method of manufacturing metal wheels having a metal rim and metal spokes, consisting in butt welding the spokes to a metal strip, finishing the welds, bending the strip to the circumference of the rim and welding its ends together and then pressing or rolling the edge of the strip to the desired shape of rim in cross-section.

3. The herein described method of manufacturing metal wheels having metal rim and tubular metal spokes secured thereto, consisting in piercing a metal strip to form thimbles or nipples projecting from the surface thereof, electrically butt welding the tubular spokes to said nipples, removing the bur formed at the welds of the several spokes, bending the strip to the circumference of the rim, causing the free ends of the spokes to converge in the hub portion and welding the two ends of the strip together.

4. The herein described method of manufacturing metal wheels having metal rim and tubular metal spokes secured thereto, consisting in piercing a metal strip to form thimbles or nipples projecting from the surface thereof, electrically butt welding the tubular spokes to said nipples, removing the bur formed at the welds of the several spokes, bending the strip to the circumference of the rim, causing the free ends of the spokes to converge in the hub portion, welding the two ends of the strip together and pressing or rolling the edges of the strip to the desired shape of felly in cross-section.

5. The herein described method of constructing a metal wheel having tubular rim or felly and spokes consisting in welding the ends of the spokes to a flat strip of sufficient length to constitute the rim of the wheel, bending said strip into the form of the circumference of the rim, welding the ends of the strip together and then pressing or forming the strip into a tube of the desired shape in cross-section to form the tubular rim or felly.

6. The herein described method of manufacturing a metal wheel having a hollow felly and spokes welded thereto, consisting in welding the spokes to a flat strip of metal of sufficient length to constitute the rim and of sufficient width to form the inclosing wall of the hollow felly, bending the strip into the circumference of the rim, welding its ends together and pressing or rolling the edges of the strip to cause them to meet and thus form the wall of the tubular felly.

7. The herein described method of manufacturing a metal wheel having metal spokes and metal rim provided with an overturned lip or edge, consisting in welding the spokes to a flat metal strip, bending the strip to the form of the circumference of the wheel and welding its free ends together, bending up the edges of said strip to form a bearing for a sheet metal ring, securing said ring to the edges of the upturned metal strip and then rolling or pressing the edge of said ring to form a lip or overturned edge.

8. The herein described method of manufacturing metal wheels having metal spokes and a hollow metal felly provided with an overturned lip or edge, consisting in welding the spokes to a flat metal strip, bending the strip to the form of the circumference of the wheel, then bending up the edges of said strip to form the side walls of the hollow felly, securing a sheet metal ring to said edges to complete the hollow rim and then rolling or pressing the edge of said ring into the desired form.

Signed at New York in the county of New York and State of New York this 29th day of May, A. D. 1919.

EDWARD FULDA.

Witnesses:
F. B. TOWNSEND,
IRENE LEFKOWITZ.